May 31, 1955 — M. PLUNGUIAN — 2,709,652
ACID SULFITE PULPING
Filed Nov. 8, 1949
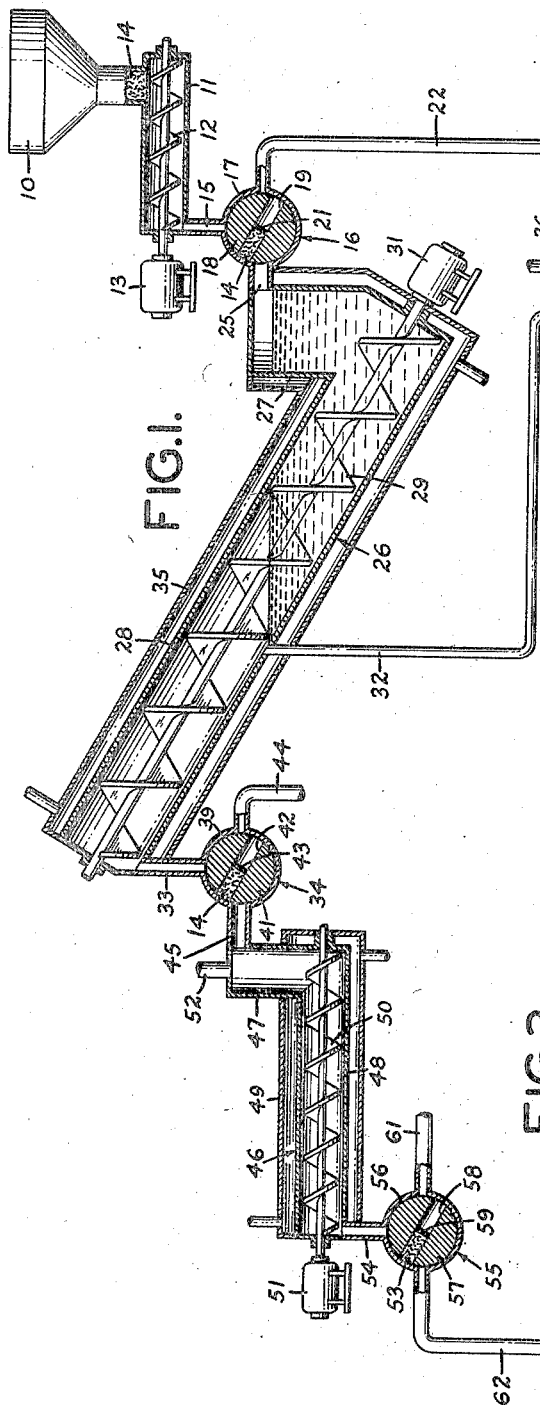
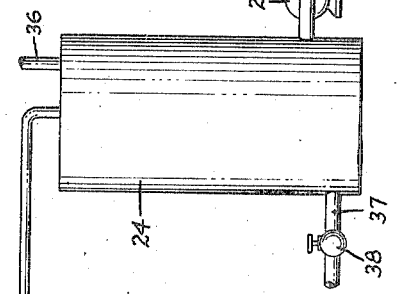
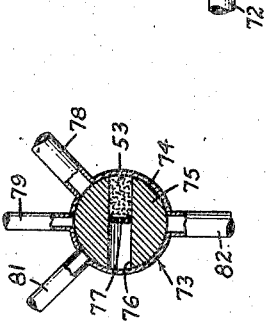
INVENTOR.
MARK PLUNGUIAN
ATTORNEYS.

United States Patent Office 2,709,652
Patented May 31, 1955

2,709,652

ACID SULFITE PULPING

Mark Plunguian, Gillette, N. J., assignor to Celanese Corporation of America, New York, N. Y., a corporation of Delaware Application November 8, 1949, Serial No. 126,131

4 Claims. (Cl. 92—11)

This invention relates to the preparation of wood pulp and relates more particularly to a process and apparatus for the preparation of high purity wood pulp suited for the production of cellulose acetate and other cellulose derivatives.

In the preparation of cellulose acetate and other cellulose derivatives from wood pulp, it is necessary to employ a high-purity wood pulp generally called a "chemical pulp" and having a maximum content of alpha cellulose and a minimum content of hemi-celluloses, pentosans, lignin, coloring matter and other impurities. If the cellulose acetate and other cellulose derivatives are prepared from a wood pulp that does not meet these specifications, filaments, films, moldings and the like produced therefrom will not meet commercial standards for strength and for freedom from color and haze. In addition, the alpha cellulose in the wood pulp must have a high degree of polymerization to yield a cellulose acetate or other cellulose derivative of a viscosity suitable for the production of the articles listed above.

In preparing chemical pulp, it has heretofore been the general practice to digest wood by the sulfite process, following which the sulfite pulp was subjected to a purification involving as many as a dozen steps to remove therefrom the impurities remaining after the digestion. As will be readily apparent, the necessity for purifying the sulfite pulp increases the amount of labor and equipment needed to produce chemical pulp and greatly increases the cost thereof. It also renders impractical the production of chemical pulp in a continuous manner.

It is an important object of this invention to provide a process and apparatus for preparing chemical pulp which will be free from the foregoing and other disadvantages of the processes and apparatus hitherto employed for this purpose.

A further object of this invention is the provision of a process and apparatus for the preparation of chemical pulp in which no purification steps or a very minimum of purification steps are required.

Another object of this invention is the provision of a process and apparatus by means of which chemical pulp can be produced in a continuous manner.

Other objects of this invention, together with certain details of construction and combinations of parts, will be apparent from the following detailed description and claims.

In accordance with my invention wood, say in the form of chips, is brought into contact with a sulfite cooking liquor at a temperature below about 120° C. and preferably at a temperature of between about 100 and 120° C. Then, after the chips have been thoroughly impregnated with the sulfite cooking liquor, the temperature is raised to between about 190 and 205° C. and held at this point until the digestion is complete, which normally takes from about 1 to 3 minutes. The wood pulp is separated from the cooking liquor and washed and, after a simple bleach, may be employed for the production of cellulose acetate and other cellulose derivatives without further purification or with a very minimum of purification.

Preferably, in carrying out the process described above, at least a portion of the excess sulfite cooking liquor that has not penetrated into the chips is drained from the chips after the impregnation thereof and before they are brought to the digestion temperature. In this way, the amount of heat required to bring the chips to the digestion temperature is reduced since it is not necessary to bring the total volume of cooking liquor to the digestion temperature and, in addition, the digestion temperature may be reached more rapidly, thereby effecting a considerable saving in time and expense. It may, however, be desirable to leave a portion of the excess cooking liquor with the chips and to circulate this cooking liquor through the chips during the digestion thereof so as to effect a more rapid transfer of heat to the impregnated chips and to equalize the temperature of the chips during the digestion. It has been found that draining the excess cooking liquor from the chips does not effect the digestion unfavorably since, under the conditions specified above, the digestion is effected by the sulfite cooking liquor within the chips and that relatively little additional cooking liquor will enter the chips during the period for which they are held at the digestion temperature. It has also been found that, so long as the initial impregnation of the chips is complete, no "burning" of the chips will take place when the chips are brought to the digestion temperature even though they are not immersed in the cooking liquor. However, if the impregnation of the chips is not complete, the centers of the chips will be burnt during the digestion, forming dark, hard masses that remain in and contaminate the wood pulp.

The sulfite cooking liquor employed to impregnate the chips should have a minimum content of combined and free $SO_2$ of about 2 and 5%, respectively when the impregnation time is held to a minimum, say less than about one hour and, when, in carrying out the digestion, all of the excess cooking liquor is drained from the impregnated chips before they are brought to the digestion temperature. If the sulfite liquor has a lower content of combined and free $SO_2$ than that above specified, the impurities remaining in the wood pulp after the digestion is complete will be sufficient to prevent the use of said wood pulp for the production of cellulose acetate and other cellulose derivatives without an elaborate and expensive purification process. However, by employing a longer impregnation time up to about 5 hours, or more, or by not draining all of the excess sulfite cooking liquor from the chips after the impregnation thereof is complete, but leaving part of this liquor in the digester, a high purity wood pulp may be obtained with a cooking liquor having a minimum content of combined and free $SO_2$ of about 1.5 and 5%, respectively. The sulfite cooking liquor may, for example, be a sodium or calcium base liquor and may be prepared in a manner well understood in the art.

The impregnation of the chips with the sulfite cooking liquor may be carried out in any suitable manner. For example, the chips may be brought into contact with an excess of the sulfite cooking liquor under a super atmospheric pressure of from about 35 to 100 pounds per square inch and at a temperature below about 120° C. and preferably between about 100 and 120° C. until the impregnation of the chips is complete. The time required for the impregnation of the chips will vary with the size of the chips, the total size of the charge being impregnated, as well as the pressure and the temperature of the sulfite cooking liquor and may range from about one minute with very small chips to about one or two hours with commercial size chips of ¾ inch length. In all cases, however, a sufficient amount of time should be allotted to the impregnation step to obtain a complete impregnation of the chips.

Following the impregnation, all or a portion of the excess sulfite cooking liquor is drained from the chips and the temperature of the chips is raised to from about 190 to 205° C. and is held within this range until the digestion is complete, which normally takes from about 1 to 3 minutes. During the digestion the pressure may be maintained between about 225 and 260 pounds per square inch by relieving the digestion vessel continuously or intermittently. The wood pulp is then cooled rapidly and washed to remove therefrom the products formed during the digestion, following which the pulp may, after a simple bleach and a light purification with dilute alkali solution, if desired, be used for the production of cellulose acetate and other cellulose derivatives. Despite the high temperatures employed during the digestion, no excessive degradation of the cellulose molecule takes place and the alpha cellulose obtained has a sufficient degree of polymerization to be suited for the production of cellulose acetate and other cellulose derivatives.

Preferred embodiments of the apparatus of my invention are shown in the accompanying drawing, wherein:

Fig. 1 is a diagrammatic view showing the general layout of the apparatus,

Fig. 2 is a diagrammatic view showing a modified form of transfer valve, and

Fig. 3 is a diagrammatic view showing a modified form of discharge valve.

Referring now to the drawing, the reference numeral 10 designates a hopper, which opens into a cylindrical chamber 11 having mounted therein a helical feed screw 12 operated by a motor 13. The helical feed screw 12 moves fresh wood chips 14 from the hopper 11 through the chamber 12 and into a vertical conduit 15 which opens into a charging valve indicated generally by reference numeral 16. The charging valve 16 comprises a casing 17 and a plug 18 rotatably mounted in said casing 17. The plug 18 is provided with a passageway 19 extending therethrough, which is divided into two equal portions by means of a perforated plate 21. Also opening into the charging valve 16 is a conduit 22 that has a pump 23 positioned therein and leads to a high pressure accumulator 24 containing the sulfite cooking liquor, and a conduit 25 that leads to a vessel, indicated generally by the reference numeral 26, wherein the impregnation of the wood chips 14 with the sulfite cooking liquor takes place.

To introduce the wood chips 14 into the vessel 26, the plug 18 of the charging valve 16 is rotated by any suitable means (not shown) until the passageway 19 is in alignment with the conduit 15, permitting the wood chips 14 to drop from the conduit 15 onto the perforated plate 21 until they fill the upper half of the passageway 19. The plug 18 is then rotated counterclockwise until the passageway 19 is in alignment with the conduits 22 and 25, at which time the pump 23 will cause the sulfite cooking liquor to flow through the conduit 22 into the passageway 19 and through the perforations in the plate 21 to sweep the wood chips 14 from the passageway 19 into and through the conduit 25. The plug 18 may then be rotated further until the passageway 19 is once more in alignment with the conduit 15 and the entire charging cycle repeated. The charging valve 16 may be operated by any suitable means which rotates the plug 18 continuously or intermittently in a single direction, or oscillates the plug 18 continuously or intermittently between the position in which a charge of fresh chips enters the passageway 19 and the position in which the chips are swept from the passageway 19 by the sulfite cooking liquor. In the latter case, the perforated plate 21 need not be positioned centrally of the passageway 19, but may be positioned toward one or one end of said passageway so that a larger volume of chips will be entered into the vessel 26 during each charging cycle.

The vessel 26 into which the wood chips 14 are entered by the charging valve 16 comprises a vertical casing 27 opening at its lower end into an inclined casing 28 having mounted therein a helical feed screw 29 operated by a motor 31. An overflow conduit 32 leading to the accumulator 24 is connected to the inclined casing 28 at a point below the level of the conduit 25 whereby the sulfite cooking liquor will not flow back into said conduit. As the wood chips 14 enter the vessel 26, they are forced below the level of the sulfite cooking liquor in the vertical casing 27 by the accumulated weight of the incoming chips. The wood chips 14 are then picked up by the helical feed screw 29 and are moved upwardly along the inclined casing 28. After the wood chips 14 are raised above the level of the sulfite cooking liquor in the inclined casing 28, the excess drains therefrom and returns to the main body of the sulfite cooking liquor in the vessel 26. The drained, impregnated chips are then dropped into a vertical conduit 33 which opens into a transfer valve, indicated generally by reference numeral 34. The sulfite cooking liquor and the wood chips 14 are kept at the proper temperature by the injection of steam into a jacket 35 surrounding the vessel 26. Fresh sulfite cooking liquor is entered into the accumulator 24 from any suitable source (not shown) through a conduit 36, and the sulfite cooking liquor may be discharge from the accumulator 24 through a conduit 37 having a valve 38 positioned therein.

The transfer valve 34, like the charging valve 16, comprises a casing 39 and a plug 41 rotatably mounted in said casing 39. The plug is provided with a passageway 42 extending therethrough which is divided into two equal portions by means of a perforated plate 43. Also opening into the transfer valve 34 is a high-pressure steam conduit 44 and a conduit 45 that leads to a digester indicated generally by reference numeral 46. To transfer the drained, impregnated wood chips from the vessel 26 to the digester 46, the transfer valve 34 may be operated in a manner similar to the charging valve 16, namely, by rotating the plug 41 continuously or intermittently in a single direction, or by oscillating the plug 41 continuously or intermittently between the position in which the drained, impregnated chips 14 enter the passageway 42 and the position in which the drained, impregnated chips 14 are swept therefrom into the digester 46.

The digester 46, into which the drained, impregnated chips are entered by the transfer valve 34, comprises a vertical casing 47 leading to a horizontal, cylindrical chamber 48 surrounded by a steam jacket 49 and having mounted therein a helical feed screw 50 operated by a motor 51. The drained, impregnated wood chips 14 entered into the digester 46 are raised to the digestion temperature by the injection of steam through a conduit 52 and are moved through the chamber 48 by the helical feed screw 50. Upon reaching the end of the chamber 48, the digested wood chips, in the form of a wood pulp 53, drop into a vertical conduit 54 which opens into a discharge valve, indicated generally by reference numeral 55. The discharge valve 55, like the charging valve 16 and the transfer valve 34, comprises a casing 56 and a plug 57 rotatably mounted in said casing 56. The plug is provided with a passageway 58 extending therethrough, which is divided into two equal portions by means of a perforated plate 59. Also opening into the discharge valve 55 is a low-pressure steam conduit 61 and a conduit 62 through which the digested pulp 53 and the sulfite waste liquor are discharged. To remove the wood pulp 53 from the digester 46, the discharge valve 55 may be operated in a manner similar to the charging valve 16 and the transfer valve 34, namely, by rotating the plug 57 continuously or intermittently in a single direction, or by oscillating the plug 57 continuously or intermittently between the position in which the wood pulp 53 enters the passageway 58 and the position in which the wood pulp 53 is swept therefrom into the conduit 62.

A modified form of transfer valve, indicated generally by reference numeral 63, that may be substituted for the transfer valve 34, is illustrated in Fig. 2 of the drawing. The transfer valve 63 comprises a casing 64 and a plug 65 rotatably mounted in said casing 64. The plug is provided with a passageway 66 extending therethrough, which is divided into two equal portions by means of a perforated plate 67. Opening into the transfer valve 63 are conduits 68, 69, 71 and 72. The conduit 68 is connected to the inclined casing 28 of the vessel 27 at a point below the level of the sulfite cooking liquor in said vessel, whereby, when the plug 65 is rotated to align the passageway 66 with the conduit 68, said passageway 66 will be filled with sulfite cooking liquor and the upper half of said passageway will be filled with impregnated wood chips 14. Then, when the plug 65 is rotated counterclockwise until the passageway 66 is aligned with the conduit 71, which leads to the accumulator 24, the sulfite cooking liquor will drain from the impregnated wood chips 14 and return to the main body of liquor in said accumulator. The conduit 69 is connected to a source of high-pressure steam and the conduit 72 is connected to the digester 46 so that when the plug 65 is rotated further in a counterclockwise direction until the passageway 66 is aligned with the conduits 69 and 72, the drained, impregnated wood chips will be swept from the passageway 66 into and through the conduit 72. When employing the transfer valve 72, the inclined casing 28 of the vessel 26 may be filled completely with the sulfite cooking liquor and may, if desired, be disposed in a horizontal rather than in an inclined position.

A modified form of discharge valve, indicated generally by reference numeral 73, that may be substituted for the discharge valve 55 is illustrated in Fig. 3 of the drawing. The discharge valve 73 comprises a casing 74 and a plug 75 rotatably mounted in said casing 74. The plug is provided with a passageway 76 extending therethrough which is divided into two equal portions by means of a perforated plate 77. Opening into the discharge valve 73 are conduits 78, 79, 81 and 82. The conduit 78 is connected to the casing 48 of the digester 46, whereby, when the plug 75 is rotated to align the passageway 76 with the conduit 78, said passageway 76 will be filled with waste sulfite cooking liquor and the upper half of said passageway will be filled with wood pulp 53. Then, when the plug 74 is rotated clockwise until the passageway 76 is aligned with the conduit 81, high pressure gases and steam escape from the wood pulp 53 and are led to an accumulator or other recovery system through the said conduit 81. The conduit 79 is connected to a source of low-pressure steam so that when the plug 74 is rotated further in a clockwise direction until the passageway 76 is aligned with the conduits 79 and 82, the wood pulp 53 will be swept from the passageway 76 into and through the conduit 82.

The following examples are given to illustrate this invention further.

*Example I*

Western Hemlock chips are treated for a period of 120 minutes with an excess of calcium base sulfite cooking liquor containing 5.5% of free $SO_2$ and 2.33% combined $SO_2$ at a temperature of 110° C. and at a pressure of 70 pounds per square inch. The chips are then drained and heated with steam over a period of 7 minutes to a temperature of 195° C. while maintaining the maximum pressure at 225 pounds per square inch by relieving the digester continuously. The chips are held at the peak temperature for 1 minute and are then cooled rapidly. The wood pulp obtained in this manner is treated for 60 minutes with a bleach containing 0.5% sodium chlorite, washed and dried. The bleached wood pulp is obtained in a yield of 41.6%, has an alpha cellulose content of 92.8%, a pentosan content of 1.5% and an intrinsic viscosity in cupri-ethylene diamine solution of 5.30.

*Example II*

The wood pulp prepared in accordance with Example I is acetylated in a manner well known in the art and yields a cellulose acetate having a viscosity in acetone (6:100) of 145 centipoises and an intrinsic viscosity in nitromethane of 1.80 and a good clarity.

*Example III*

The cellulose acetate prepared in accordance with Example II is dissolved in acetone together with 25% by weight of dibutyl phthalate and is cast to yield a film that has a good clarity and tensile strength and elongation values of 7.2 kilograms per square millimeter and 27% respectively.

*Example IV*

A sufficient quantity of the cellulose acetate prepared in accordance with Example II is dissolved in acetone to produce a solution having a concentration of 22.8%. The solution so formed is spun in a manner well known in the art and yields a multi-filament yarn having a tenacity of 1.04 grams per denier and an elongation of 28.7% at the breaking point.

It is to be understood that the foregoing detailed description is given merely by way of illustration and that many variations may be made therein without departing from the spirit of my invention.

Having described my invention, what I desire to secure by Letters Patent is:

1. In a process for the preparation of wood pulp, the steps which comprise thoroughly impregnating wood chips with a sulfite cooking liquor, containing at least about 1.5% of combined $SO_2$ and at least about 5% free $SO_2$, based on the amount of sulfite cooking liquor, at a temperature of 100 to 120° C. and at superatmospheric pressure, and then heating the impregnated wood chips to a temperature between 190 and 205° C. and held at the peak temperature for from 1 to 3 minutes so as to effect the digestion of the wood chips to wood pulp.

2. In a process for the preparation of wood pulp, the steps which comprise thoroughly impregnating wood chips with a sulfite cooking liquor, containing at least about 1.5% of combined $SO_2$ and at least about 5% free $SO_2$, based on the amount of sulfite cooking liquor, at a temperature of 100 to 120° C. and at superatmospheric pressure, draining at least a portion of the sulfite cooking liquor from the impregnated wood chips, and then heating the impregnated wood chips to a temperature between 190 and 205° C. and held at the peak temperature for from 1 to 3 minutes so as to effect the digestion of the wood chips to wood pulp.

3. In a process for the preparation of wood pulp, the steps which comprise passing wood chips through a zone containing a sulfite cooking liquor, containing at least about 1.5% of combined $SO_2$ and at least about 5% free $SO_2$, based on the amount of sulfite cooking liquor, at a temperature between 100 and 120° C. and at superatmospheric pressure until the wood chips are thoroughly impregnated with sulfite cooking liquor, and then passing the impregnated wood chips through a second zone wherein the wood chips are heated to a temperature of between 190 and 205° C. and held at the peak temperature for from 1 to 3 minutes so as to effect the digestion of the wood chips to wood pulp.

4. In a process for the preparation of wood pulp, the steps which comprise passing wood chips through a zone containing a sulfite cooking liquor, containing at least about 1.5% of combined $SO_2$ and at least about 5% free $SO_2$, based on the amount of sulfite cooking liquor, at a temperature between 100 and 120° C. and at superatmospheric pressure until the wood chips are thoroughly impregnated with sulfite cooking liquor, draining at least a portion of the sulfite cooking liquor from the impregnated wood chips as it passes through said zone, and then passing the impregnated wood chips through a second zone wherein the wood chips are heated to a temperature of between 190 and 205° C. and held at the peak temperatures for from 1 to 3 minutes so as to effect the digestion of the wood chips to wood pulp.

References Cited in the file of this patent

UNITED STATES PATENTS

| | | |
|---|---|---|
| 848,484 | Newnham | Mar. 26, 1907 |
| 1,347,979 | Werner | July 27, 1920 |
| 1,505,934 | Olier | Aug. 19, 1924 |
| 1,830,421 | Bradley et al. | Nov. 3, 1931 |
| 1,856,453 | Bacchus | May 3, 1932 |
| 1,859,845 | Rue et al. | May 24, 1932 |
| 1,880,042 | Richter | Sept. 27, 1932 |
| 1,894,577 | Wells | Jan. 17, 1933 |
| 1,915,812 | Wollenberg | June 27, 1933 |
| 1,938,802 | Braun et al. | Dec. 12, 1933 |
| 1,954,012 | Lemberger et al. | Apr. 10, 1934 |
| 1,982,130 | Wollenberg | Nov. 27, 1934 |
| 1,991,244 | De la Roza | Feb. 12, 1935 |
| 2,019,598 | Dreyfus | Nov. 5, 1935 |
| 2,067,480 | De la Roza | Jan. 12, 1937 |
| 2,137,779 | Olsen | Nov. 22, 1938 |
| 2,287,332 | Steely | June 23, 1942 |
| 2,425,335 | Messing et al. | Aug. 12, 1947 |
| 2,542,801 | De la Roza | Feb. 20, 1951 |
| 2,599,572 | Miller | June 10, 1952 |

FOREIGN PATENTS

| | | |
|---|---|---|
| 54,017 | Norway | June 4, 1934 |
| 63,480 | Norway | Apr. 28, 1941 |
| 559,909 | Great Britain | Mar. 10, 1944 |
| 825,254 | France | Feb. 28, 1938 |

OTHER REFERENCES

Aronovsky et al.: Ind. & Eng. Chem., December 1933, pp. 1349–1354.

Hausen: Paper Trade J., March 3, 1927, p. 55.

Miller: Technical Assn. Papers, Series IX, pp. 114–117.

Grogaard: Chemical Abstracts 40, 7624 (1946).